Nov. 4, 1924.

C. A. RASCO 1,514,303

SPRING SUSPENSION FOR VEHICLES

Filed Dec. 26, 1922

INVENTOR.
Charles A. Rasco
BY
ATTORNEYS.

Patented Nov. 4, 1924.

1,514,303

UNITED STATES PATENT OFFICE.

CHARLES A. RASCO, OF MERCED FALLS, CALIFORNIA.

SPRING SUSPENSION FOR VEHICLES.

Application filed December 26, 1922. Serial No. 609,053.

*To all whom it may concern:*

Be it known that I, CHARLES A. RASCO, a citizen of the United States, and a resident of Merced Falls, county of Merced, State of California, have invented a new and useful Spring Suspension for Vehicles, of which the following is a specification.

My invention relates to spring suspensions for vehicles and has for its primary object to provide means for realizing an easier riding vehicle which will relieve the occupants of all disagreeable shocks and vibrations instant to uneven road surfaces and to also prevent the likelihood of the vehicle tipping over due to sidesway and other causes which are present with the heretofore employed spring suspension.

Figure 1:
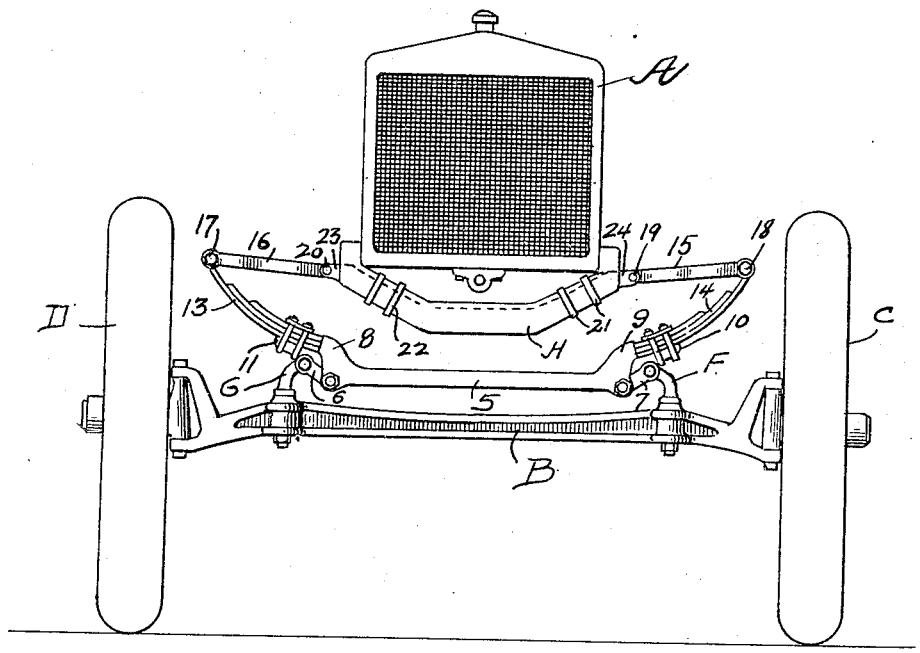
Figure 2:
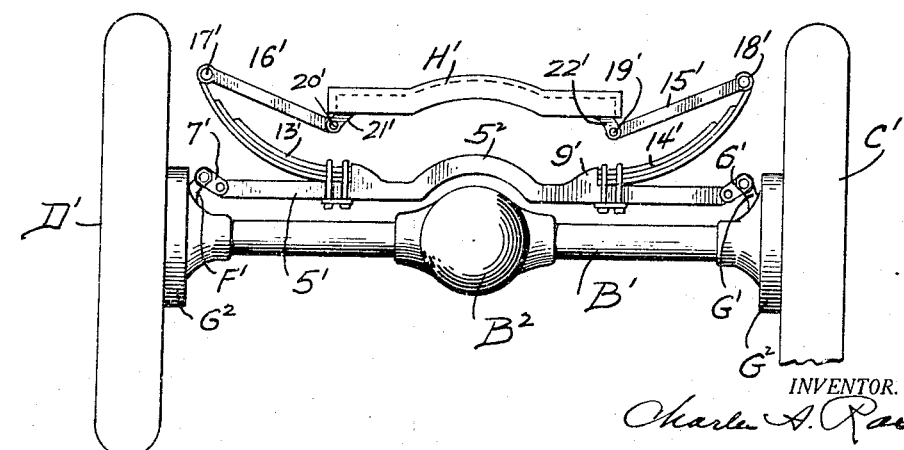

The invention possesses further objects and features which will appear as the description proceeds with reference to the accompanying drawing in which Figure 1 is a view in elevation of the front of a vehicle illustrating the application of the invention and Figure 2 is a similar view of a rear spring suspension.

Referring now to the drawing in detail the principle of my invention will apply equally well to both the front and rear of the vehicle and for the purpose of illustrating the salient features of the same I have elected to show it applied to an automobile known as the Ford. (A) represents the customary radiator, (B) the steering axle having the usual steering wheels (C) and (D). As is customary the steering axle (B) is equipped with spring perches (F) and (G) adjacent to the respective ends of the axle (B). As heretofore practiced these spring suspensions were made to connect the usual front spring of the vehicle which is arranged lengthwise with the axle (B) and fastened in the channel yoke (H). According to my invention I do away with this spring structure and substitute a horizontal member (5) with its ends connected by links (6) and (7) to the spring perches (F) and (G). This member is adapted to lie parallel to the axle (B) and transversely of the vehicle. Arranged above the link connections (6) and (7) are abutments (8) and (9) which cooperate with ledges (10) and (11) for providing a mounting for the ends of the upwardly curved leaf spring elements (13) and (14). The opposite ends of these spring elements are made to be pivotally connected to the frame of the vehicle preferably by pivoted arms (15) and (16), the same being pivoted to the spring elements as at (17) and (18) with their opposite ends pivoted as at (19) and (20) to an insert member which is formed to coincide to and be received within the channel yoke (H). Suitable clamps or the like (21) and (22) are used to maintain the insert member within the channel (H).

The insert member is also made with extensions (23) and (24) to provide the pivoted connections for one end of the arms (15) and (16).

Referring now to the same structure as applied to the rear of the vehicle. The horizontal member (5') is made to lie parallel to the driving axle (B') with its opposite ends connected by pivoted links (6') and (7') to perches (F') and (G') which perches form an existing part of the heretofore employed rear spring of the vehicle. These perches are usually provided on the housings (G²) for the brakes of the driving wheels (C') and (D'). The horizontal member (5') is made with a curved intermediate portion (5²) to accommodate the member to the differential housing (B²). Provided on top of the member (5') are abutments (8') and (9') for mounting the leaf spring elements (13') and (14'). Suitable shackles or U clamps are made to hold the spring elements on the member as shown.

The spring elements (13') and (14') like the spring elements (13) and (14) are adapted to be pivotally connected to the frame of the vehicle by spring arms (15') and (16'). These arms are pivotally connected to the spring elements as at (17') and (18') with their opposite ends pivotally connected as at (19') and (20') to the extended ends (21') and (22') of an insert which is received within the channel (H').

The so-called pivoted arms (15) and (16) and (15') and (16') are in reality fulcrumed members and all shocks and vibrations from the wheels of the vehicle will be absorbed so to speak not only by the leaf spring elements of the suspension but also by the fulcrumed parts and pivotal connections leaving the body of the vehicle so supported or suspended that the riding qualities are greatly improved over and above the heretofore accepted arrangements.

In those types of vehicles requiring the spring suspension to extend longitudinally of the vehicle body the same arrangement may be provided for by a reversible part.

I claim:

1. In a motor vehicle, an axle, a bar suspended thereover parallel thereto with freedom of endwise swinging motion forming an outwardly facing seat at either end and a leaf spring perched on each seat and curving upwardly, with the vehicle body suspended between the free ends of the springs.

2. In a motor vehicle, an axle, a bar suspended thereover parallel thereto with freedom of endwise swinging motion forming an outwardly facing seat at either end with each seat comprising a ledge and a back and a leaf spring perched on each seat so as to lie on the ledge and to abut with its end against the back curving upwardly, with the vehicle body suspended between the free ends of the springs.

3. In a motor vehicle, an axle, a bar suspended thereover parallel thereto with freedom of endwise swinging motion forming an outwardly facing seat at either end with each seat comprising a ledge and a back and a leaf spring perched on each seat so as to lie on the ledge and to abut with its end against the back curving upwardly, with the vehicle body suspended between the free ends of the springs, the ledge and the back being inclined to cause the back to assume a substantial part of the load.

CHARLES A. RASCO.